United States Patent
Baba et al.

(10) Patent No.: US 6,671,110 B2
(45) Date of Patent: Dec. 30, 2003

(54) METHOD AND APPARATUS FOR DETECTING ABNORMAL MAGNETIC HEAD FLY HEIGHT

(75) Inventors: Sachiyo Baba, Yamato (JP); Yukio Fukushima, Chohfu (JP); Hidetsugu Tanka, Fujisawa (JP); Tetsuo Ueda, Sagamihara (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 365 days.

(21) Appl. No.: 09/776,360

(22) Filed: Feb. 2, 2001

(65) Prior Publication Data

US 2001/0013985 A1 Aug. 16, 2001

(30) Foreign Application Priority Data

Feb. 9, 2000 (JP) .................................. 2000-031948

(51) Int. Cl.$^7$ ......................... G11B 27/36; G11B 15/04; G11B 21/02
(52) U.S. Cl. ..................... 360/31; 360/60; 360/75
(58) Field of Search .................. 360/75, 25, 31, 360/46, 60

(56) References Cited

U.S. PATENT DOCUMENTS

| 6,094,318 A | * | 7/2000 | Kim | 360/60 |
| 6,411,458 B1 | * | 6/2002 | Billings et al. | 360/75 |
| 6,483,789 B1 | * | 11/2002 | Kubota et al. | 369/53.16 |

FOREIGN PATENT DOCUMENTS

JP  11298461  * 10/1999

* cited by examiner

*Primary Examiner*—Regina N. Holder
(74) *Attorney, Agent, or Firm*—Robert B. Martin; Bracewell & Patterson, L.L.P.

(57) ABSTRACT

A method and apparatus for detecting an abnormal fly height of a magnetic head. The method includes reproducing a servo signal recorded on a magnetic disk in advance by the magnetic head when a write operation for writing data on the magnetic disk by the magnetic head is initiated. Next, the gain of the servo signal based on the head part of the servo signal reproduced by the magnetic head is determined. The gain of the servo signal is then compared with a reference value to detect an abnormal fly height of the magnetic head. In an advantageous embodiment, the reference value is the gain of a servo signal determined when the fly height of the magnetic head is normal. Alternatively, in other advantageous embodiments, the reference value is based on the gain of a previous servo signal.

21 Claims, 11 Drawing Sheets

|  | Zone 0 (cyl 0-1999) | Zone 1 (cyl 2000-3999) | ...... |
|---|---|---|---|
| Head 0 | 188 | 182 | ...... |
| Head 1 | 176 | 174 | ...... |
| Head 2 | 201 | 196 | ...... |
| Head 3 | 190 | 188 | ...... |

*Fig. 7*

|  | Zone 0 (cyl 0-1999) | Zone 1 (cyl 2000-3999) | ...... |
|---|---|---|---|
| Head 0 | 207 | 200 | ...... |
| Head 1 | 194 | 191 | ...... |
| Head 2 | 221 | 216 | ...... |
| Head 3 | 209 | 207 | ...... |

*Fig. 8*

METHOD AND APPARATUS FOR DETECTING ABNORMAL MAGNETIC HEAD FLY HEIGHT

BACKGROUND OF THE INVENTION

1. Technical Field

The present invention relates to a method for detecting an abnormal fly height of a magnetic head during a write operation in a hard disk drive (HDD) apparatus, a method for using the method for detecting abnormal magnet head fly height to prevent damage to written data, and a hard disk drive apparatus for implementing these methods.

2. Description of the Related Art

In an HDD apparatus, a head slider having a magnetic head is mounted on an end of a suspension arm. The suspension arm is swiveled in a plane parallel to the recording surface of a magnetic disk to move the magnetic head in a substantially radial direction of the magnetic disk to access data at a given position on the magnetic disk.

The head slider flies on an "air bearing" formed by the spinning of the magnetic disk while being elastically held by the suspension arm against the force for lift. Thus the head slider and the magnetic disk are close to each other without coming into contact with each other and a constant distance between them is maintained. The distance between the head slider and the magnetic disk is called "fly height."

The fly height of the magnetic head can become abnormally high during the operation of the HDD apparatus. This may be caused by a disorder of the air bearing due to a thermal asperity or dust on the magnetic disk, or a shock from outside of the HDD apparatus. If the magnetic head flies abnormally high, the level of a signal reproduced by the magnetic head drops. If a write operation is performed during such a period, data cannot be recorded correctly, even though the write operation is completed with no error being detected. The data recorded incorrectly may not be recovered even if error-correcting capability is used during a read operation.

To prevent such damage to data during a write operation, a method for detecting an abnormal fly height of a magnetic head based on an output waveform of a servo signal has been proposed. If the fly height of the magnetic head becomes abnormally high, the high frequency property of a signal reproduced by the magnetic head and amplified by an amplifier may be degraded. For example, assuming that the amplitude of a servo signal is the same, an output waveform when the flying height is normal as shown in FIG. 13A would change into a waveform having an increased width and area as shown in FIG. 13B. To prevent this, according to a prior-art method, a variation in the fly height of the magnetic head is detected by measuring the peak value (amplitude) and area of the output waveform of a servo signal and calculating a ratio between these values.

However, for the prior-art HDD apparatus in which an abnormal fly height of a magnetic head is detected based on the ratio of the peak value (amplitude) to area of the output waveform of a servo signal as described above, an extra circuit for measuring the peak value of the output waveform as well as a circuit for measuring the area of the output waveform is required, increasing the cost of the apparatus.

SUMMARY OF THE INVENTION

A method for detecting an abnormal fly height of a magnetic head is disclosed. The method includes reproducing a servo signal recorded on a magnetic disk in advance by the magnetic head when a write operation for writing data on the magnetic disk by the magnetic head is initiated. Next, the gain of the servo signal based on the head part of the servo signal reproduced by the magnetic head is determined. The gain of the servo signal is then compared with a reference value to detect an abnormal fly height of the magnetic head. In an advantageous embodiment, the reference value is the gain of a servo signal determined when the fly height of the magnetic head is normal. Alternatively, in other advantageous embodiments, the reference value is based on the gain of a previous servo signal.

In another embodiment of the present invention, the amplitude of the servo signal is determined instead of the gain. The amplitude of the servo signal is then compared to a reference value that, in an advantageous embodiment, is the amplitude of a servo signal determined when the fly height of the magnetic head is normal. Alternatively, in other advantageous embodiments, the reference value is based on the amplitude of a previous servo signal. In a related embodiment, a hard disk drive apparatus utilizes an amplitude detection circuit to determine the amplitude of the servo signal. The amplitude detection circuit includes a full-wave rectifier that converts the servo signal into a DC signal. A sample hold circuit, coupled to the full-wave rectifier, is utilized to sample the converted DC signal to obtain the amplitude of the servo signal. The amplitude detection circuit also includes a capacitor coupled to the sample hold circuit and a reset switch that operates to store a maximum voltage of the servo signal during a certain period of time in the capacitor.

In another aspect of the present invention, a method for writing data on a magnetic disk is disclosed. The method includes reproducing a servo signal recorded on the magnetic disk utilizing a magnetic head in response to an initiation of a write operation. Next, the gain of the servo signal is determined. The gain is then compared with a reference value to detect an abnormal fly height of the magnetic head. It should be noted that in another advantageous embodiment, the amplitude of the servo signal may be alternatively utilized in place of the gain. In response to detecting an abnormal fly height of the magnetic disk, the write operation is terminated. In a related embodiment, the method further includes retrying the write operation after discontinuing the write operation in response to detecting an abnormal fly height.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 illustrates a table containing the actual measurement value of the gain of a servo signal for each cylinder area;

FIG. 8 illustrates a table containing reference value for the gain of a servo signal for each cylinder area;

DETAILED DESCRIPTION OF THE PREFERRED EMBODIMENTS

Figure 1:
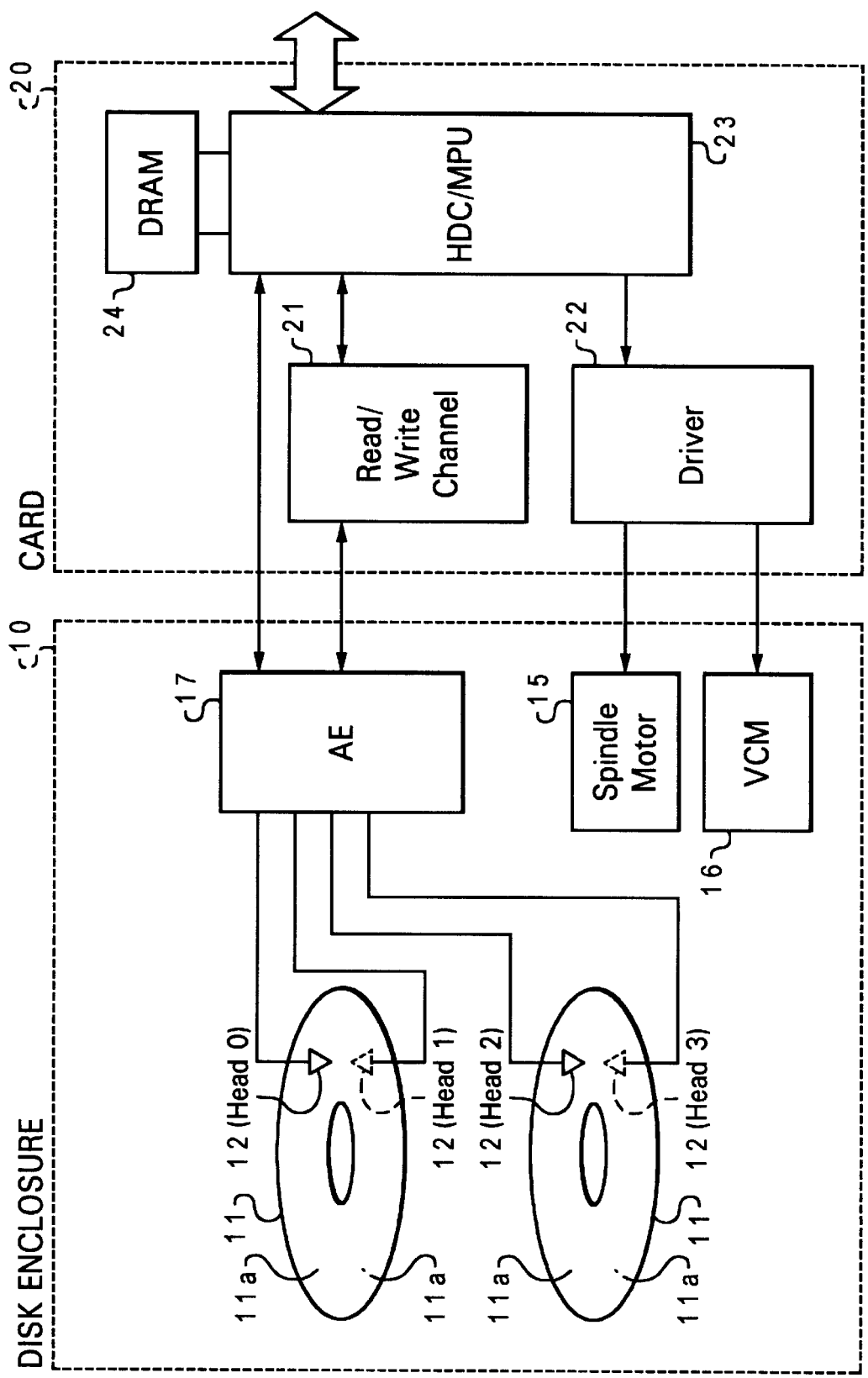
FIG. 1 illustrates a simplified block diagram of an HDD apparatus of the first embodiment of the present invention.
Figure 2:
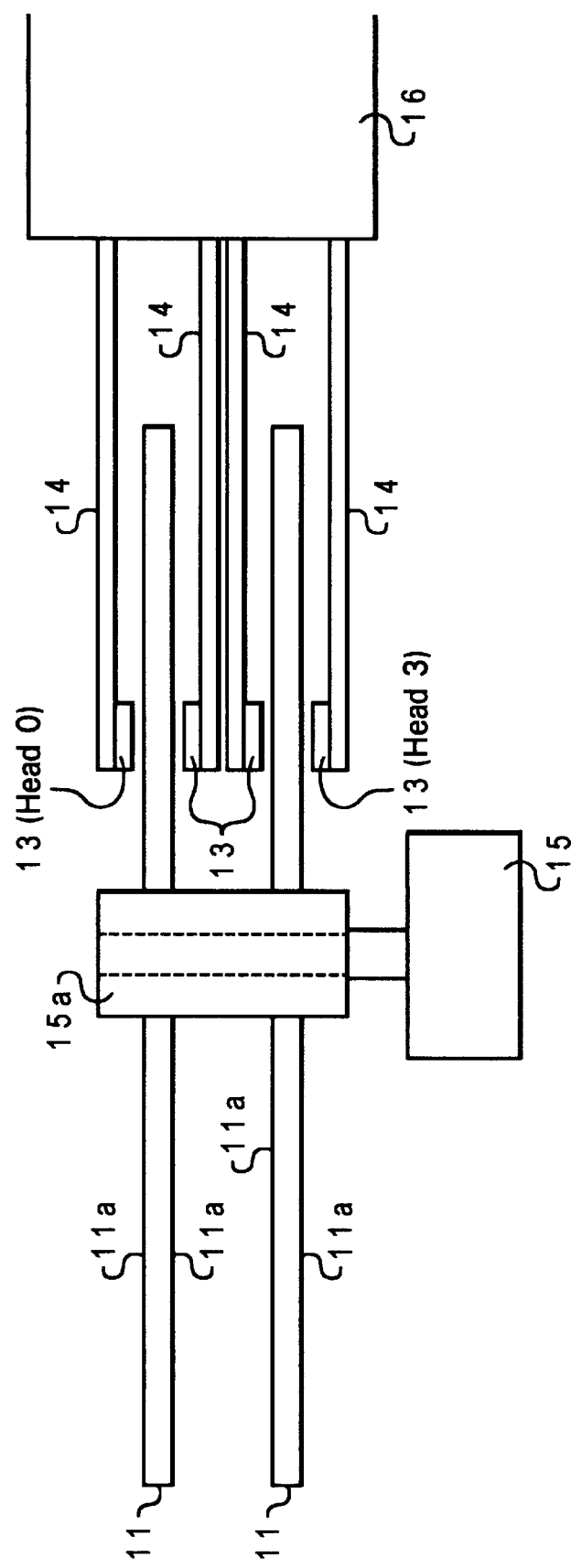
FIG. 2 illustrates a cross-sectional view of the driving mechanism of the HDD apparatus shown in FIG. 1.

Preferred embodiments of a hard disk drive (HDD) apparatus according to the present invention will be described below with reference to the accompanying drawings.
First Embodiment FIG. 1 depicts a schematic block diagram of a first embodiment of a HDD according to the present invention. FIG. 2 illustrates a cross-sectional view of the driving mechanism of the HDD apparatus shown in FIG. 1. As shown in FIG. 1, the HDD apparatus comprises two magnetic disks 11 having top and bottom sides on which recording surfaces 11a (where data is to be recorded on) are provided. The HDD apparatus also includes four magnetic heads 12 corresponding to each of the four recording surfaces 11a provided by the two magnetic disks 11. Identifiers Head0 to Head3 are assigned to the four magnetic heads 12 to identify them. The magnetic head 12 may be, for example, a combined head having a recording head (not shown) for recording data on a corresponding recording surface 11a and a reproducing head (not shown) for reproducing the data recorded on the corresponding recording surface 11a. The recording head is formed by an inductance device and the reproducing head is formed by a magnetoresistive (MR) device or a giant magnetoresistive (GMR) device. The number of magnet disks 11 may be one or more and the recording surface 11a may be provided on a single side or the both sides of the magnetic disk 11.

The two magnetic disks 11 are fixed on a rotating shaft 15a of a spindle motor 15 as shown in FIG. 2 and rotated by the spindle motor 15. The four magnetic heads 12 are provided on their respective head sliders 13. The four head sliders 13 are fixed on the ends of their suspension arms 14. Each of the four suspension arms 14 is attached to a voice coil motor (VCM) 16 so that its head slider 13 is opposed to each recording surface 11a elastically supporting the head slider 13. Each of the suspension arms 14 is swiveled together with the head slider 13 by the VCM 16. This swiveling moves the head 12 (head slider 13) in a substantially radial direction of the disk 11 to access data at any position on the recording surface 11a of the magnetic disk 11.

The driving mechanism, which consists of the magnetic disks 11, spindle motor 15, head sliders 13, suspension arms 14, and VCM 16, is contained in a housing (disk enclosure) 10 together with an arm electronics (AE) 17 shown in FIG. 1. The driving mechanism is controlled by a control circuit 20 formed by a circuit board (card) outside the disk enclosure 10. The control circuit 20 comprises a read/write (R/W) channel 21, a driver 22, a hard disk controller (HDC)/micro processing unit (MPU) 23, and dynamic random access memory (DRAM) 24.

The AE 17 selects one of the four magnetic heads 12 for accessing data, pre-amplifies a signal reproduced by the selected magnetic head 12 at a certain gain, sends it to the R/W channel 21, and sends a recording signal received from the R/W channel 21 to the selected magnetic head 12. The R/W channel 21 converts write data to be recorded on the magnetic disk 11 into a recording signal for the magnetic head 12 and converts a signal reproduced from the magnetic disk 11 by the magnetic head 12 into read data. The driver 22 drives the spindle motor 15 and the VCM 16. A host device, which is not shown, accessing data in the HDD device is connected to the HDC/MPU 23. The HDC/MPU 23 has ROM (not shown) in its interior, sends/receive data to and from the host device according to a control program and control data stored in the ROM and the magnetic disk 11, and performs arithmetic operations for servo and data error control to control the AE 17, R/W channel 21, and driver 22. The DRAM 24 stores the control program and control data read from the magnetic disk 11 and temporarily stores data received from the host device and to be written on the magnetic disk 11 and data read from the magnetic disk 11 and to be sent to the host device.

Figure 3:
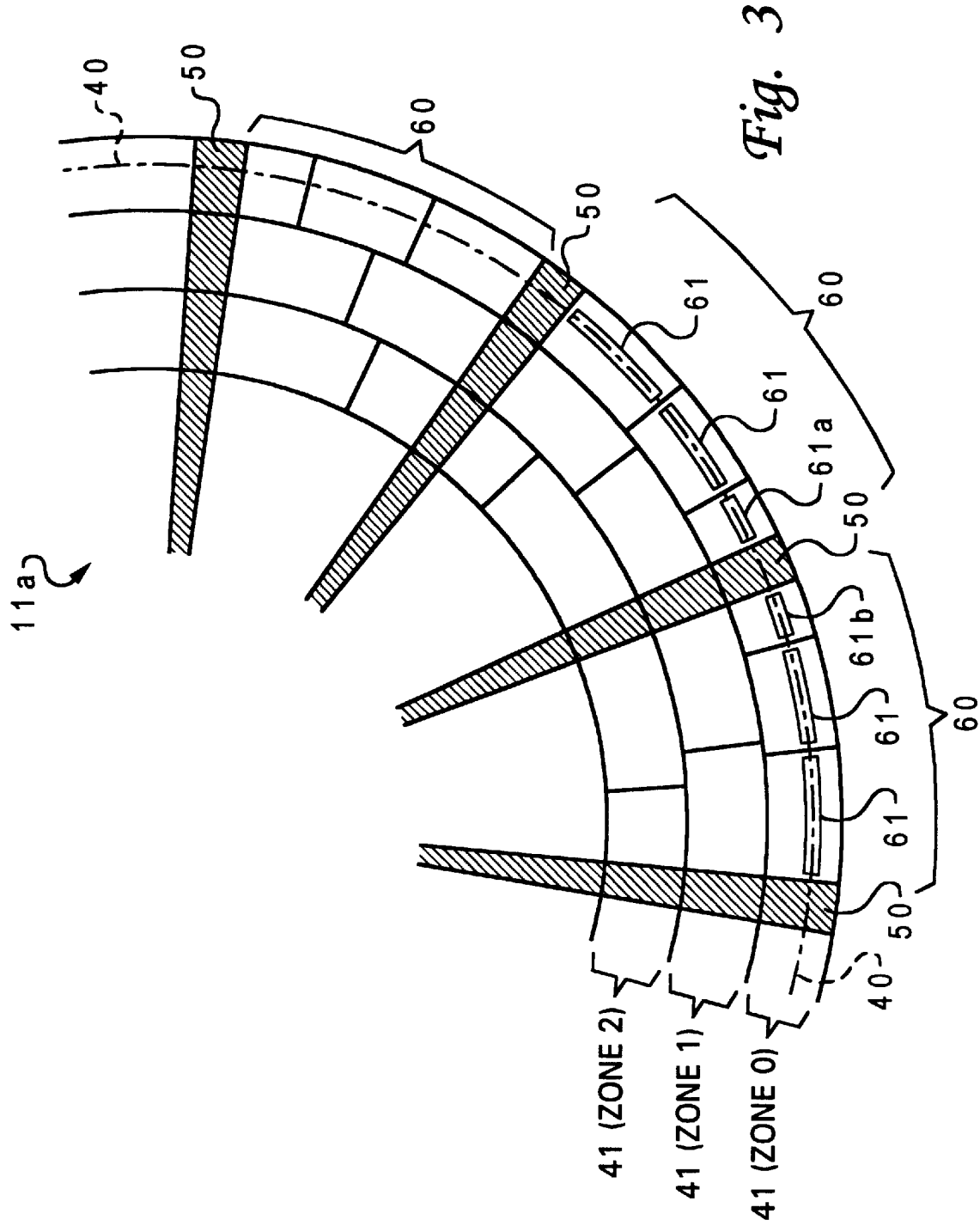
FIG. 3 illustrates a structural diagram of the recording surface of a magnetic disk.

FIG. 3 depicts a structural diagram of the recording surface of a magnetic disk. As shown in FIG. 3, a plurality of servo areas 50 (shaded areas in FIG. 3) and data areas 60 separated by borders radially extending from the center of the magnetic disk 11 are alternately provided at a predetermined angle on the recording surface 11a of the magnetic disk 11. In other words, the servo areas 50 are provided at every predetermined angle and the data area 60 is provided between two adjacent servo areas 50. About 60 to 80 servo areas 50, for example, are provided in the circle. Servo data for controlling the positioning of the magnetic head 12 is stored in each servo area 50. User data (hereinafter also called simply "data") is stored in each data area 60.

A plurality of tracks 40, which have a predetermined radial width and are concentrically divided, are provided on the recording surface 11a of the magnetic disk 11. Servo and user data is recorded along the tracks 40. The tracks 40 are grouped into a plurality of cylinder areas 41 divided according to a radial position (the position of a cylinder) on the magnetic disk 11. A single cylinder area 41 consists, for example, of about 1,000 tracks 40. Identifiers Zone0, Zone1, Zone2, . . . are assigned to the cylinder areas 41 sequentially from the outmost cylinder area 41 to identify each cylinder area.

A track 40 in a data area 60 is further divided into a plurality of sectors 61. Data is recorded/reproduced on a sector 61 basis. For example 512 bytes of data is recorded in a sector 61. The number of sectors 61 contained in a track 40 is set in each cylinder area 41. Because the circumference of a track 40 in an inner cylinder area 41 is smaller, the number of sectors 61 in the inner track is smaller. On the other hand, because the circumference of a track 40 in an outer cylinder area 41 is larger, the number of sectors 61 in the outer track is large. The number of sectors contained in a data area 60 of a track 40 is not limited to an integer. For example, 2.5 sectors 61 may be provided in one data area 60 of the track 40 contained in cylinder area Zone0 41, two sectors 61 may be provided in one data area 60 of the track 40 contained in cylinder area Zone1 41, and 1.5 sectors 61 may be provided in one data area 60 of the track 40 contained in cylinder area Zone2 41. One sector 61 may be divided into sections 61a and 61b and data may be stored in two data areas 60 separated by a servo area 50. A system area, which is not shown, is provided on the recording surface 11a of the magnetic disk 11 for storing the control program and control data for the HDD apparatus. An alternate sector (not shown) which replaces a defective sector where data cannot be recorded in or reproduced from is provided in an inner region of each cylinder area 41.

Figure 4:
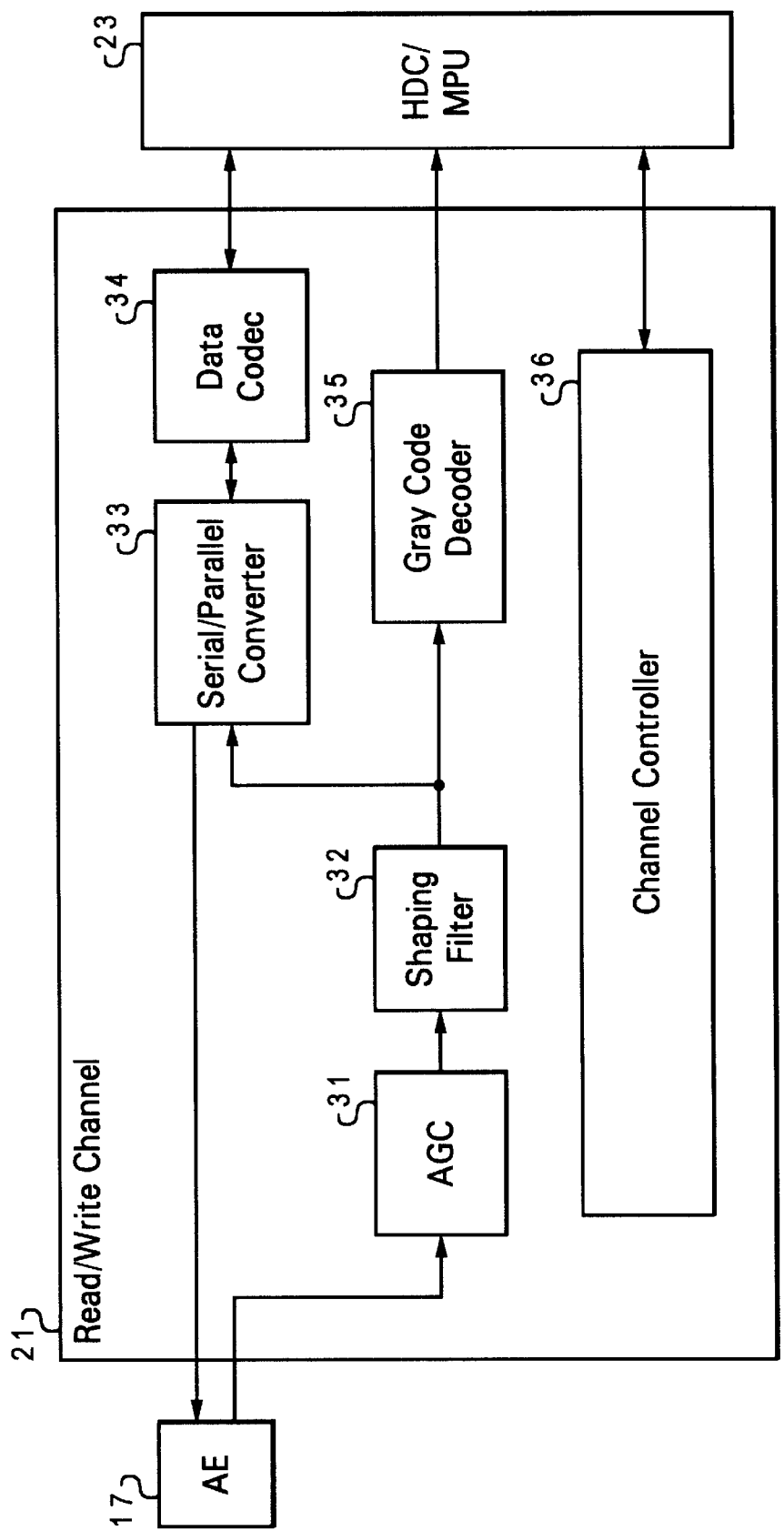
FIG. 4 illustrates a block diagram of a read/write channel.
Figure 5:
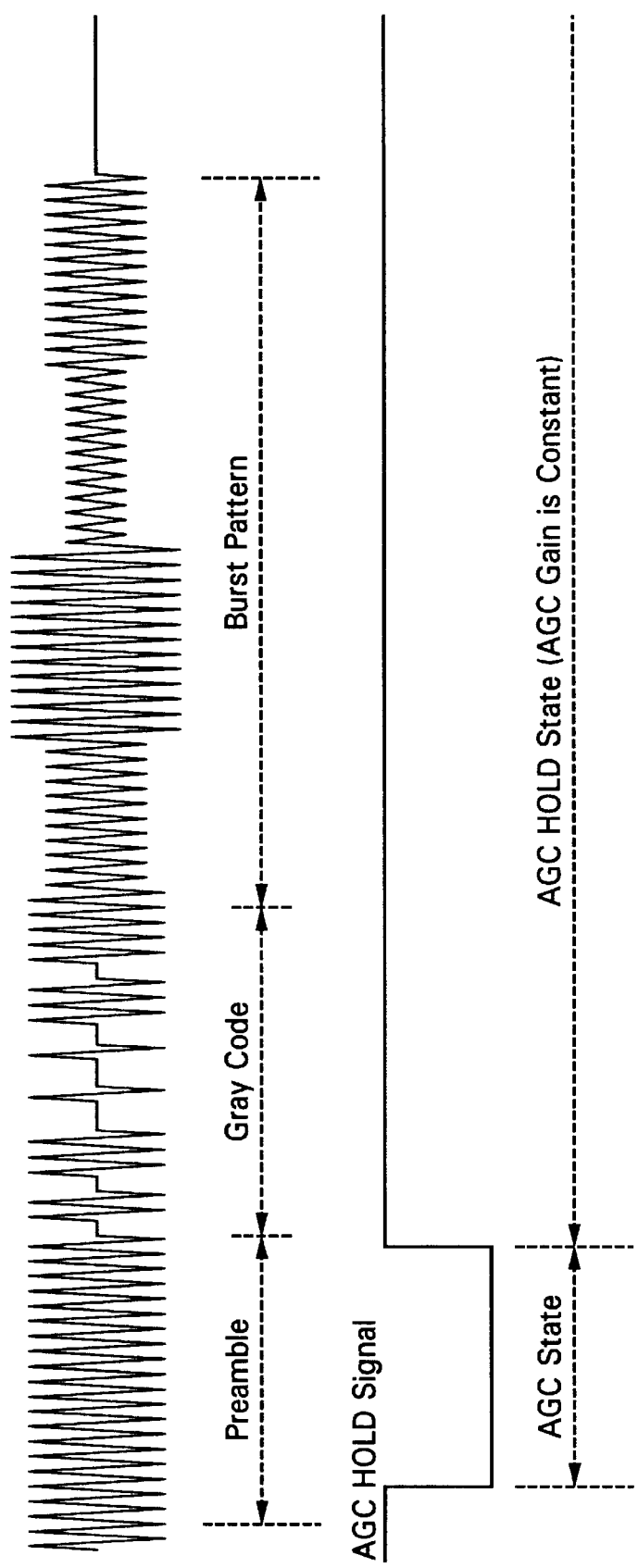
FIG. 5 illustrates a diagram for explaining the reproduction signal of servo data.

FIG. 4 illustrates a block diagram of the Read/Write (R/W) channel shown in FIG. 1. FIG. 5 depicts a drawing for explaining the reproduction signal of servo data. As described earlier, the R/W channel 21 converts write data to be recorded on the magnetic disk 11 into a recording signal for the magnetic head 12 and converts a signal reproduced from the magnetic disk 11 by the magnetic head 12 into read data. The R/W channel 21 comprises an automatic gain controller (AGC) 31, a shaping filter 32, a serial-parallel converter 33, a data codec 34, gray-code decoder 35, and a channel controller 36 as shown in FIG. 4.

AGC 31 amplifies a reproduction signal reproduced by the magnetic head 12 and pre-amplified at a certain gain by the AE 17 to a signal level processed by the HDC/MPU 23. If the reproduction signal is user data, the AGC 31 automatically adjust its gain in response to a change in the signal level of a reproduction signal under feedback control based on digital processing so that the amplitude of the amplified reproduction signal is within a certain range. If the reproduction signal is servo data, the AGC 31 determines its gain based on the head part of a servo signal and amplifies the subsequent section of the servo signal which succeeds the head part according to the determined gain.

As shown in FIG. 5, the servo signal (reproduction signal of servo data) includes a preamble, gray code, and burst pattern. The preamble is the head part of the signal. The preamble is used to read the gray code by synchronizing the servo signal and determine the gain of the servo signal. The gray code is position information, such as a cylinder identifier and physical sector number (PHSN), represented by a cyclic binary code. The burst pattern is used to digitize changes in the amplitude of a reproduction signal to control the tracking of the magnetic head 12. When the preamble is reproduced, an AGC HOLD signal goes low and the AGC 31 adjusts the gain. Then, the AGC HOLD signal goes high at a predetermined timing, the gain of the servo signal is determined and maintained constant by the AGC 31 (the AGC enters AGC HOLD state). The gray code and the burst pattern are amplified by the AGC 31 with a certain gain.

Returning to FIG. 4, the shaping filter 32 shapes the waveform of a reproduction signal amplified by the AGC 31. The serial-parallel converter 33 converts the reproduction signal (serial signal) of user data shaped by the shaping filter 32 into read data (parallel signal) and converts write data (parallel signal) from the data codec 34 into a recording signal (serial signal). The data codec 34 decodes the read data (user data) converted by the serial-parallel converter 33 and outputs it to the HDC/MPU 23. The data codec 34 also encodes the write data from the HDC/MPU 23 and outputs it to the serial/parallel converter 33. The gray code-decoder 35 decodes the gray code in the servo signal shaped by the shaping filter 32 and outputs it to the HDC/MPU 23. The channel controller 36 controls the above-mentioned components according to a control signal from the HDC/MPU 23. The channel controller 36 has a register, which is not shown, within it for storing a gain set by the AGC 31 in the register.

Figure 6:
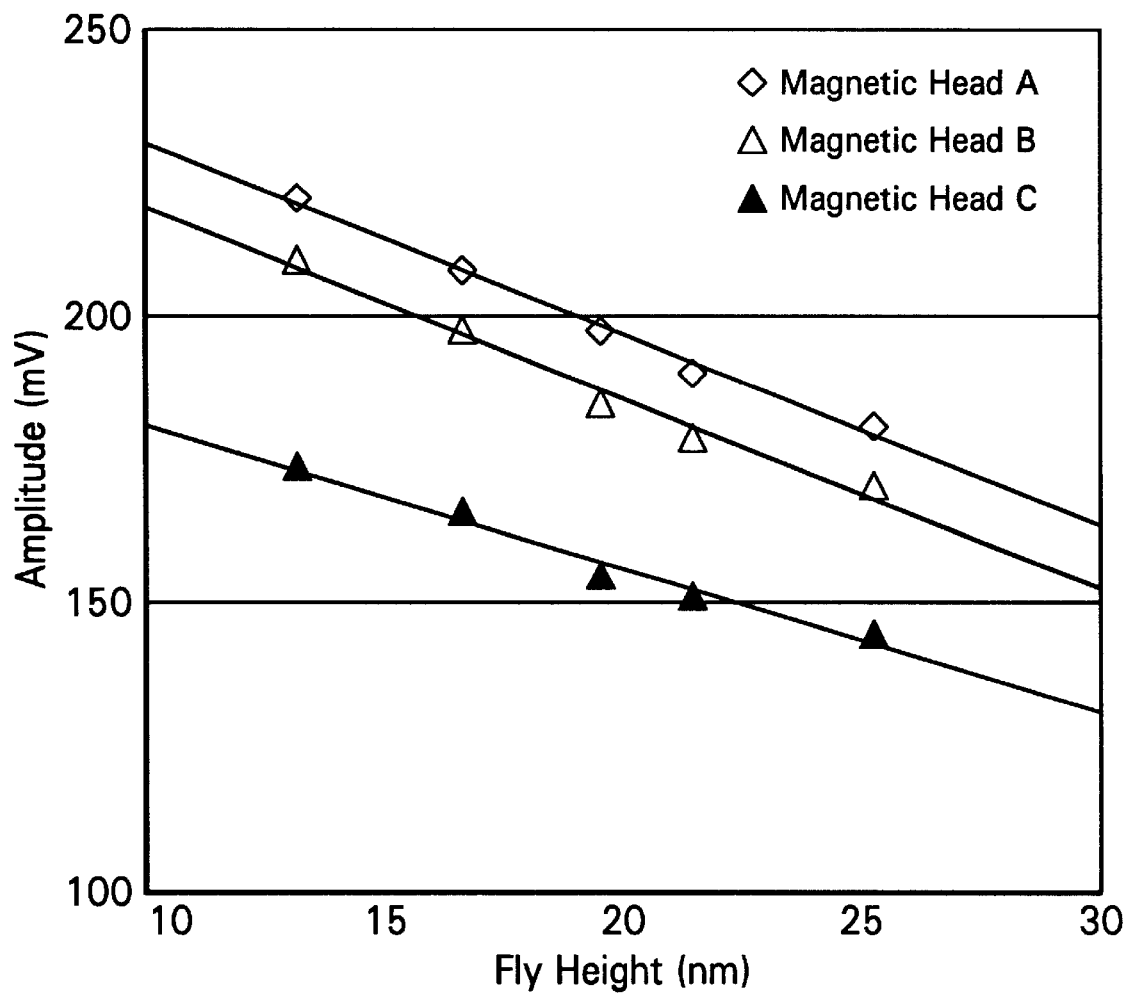
FIG. 6 illustrates a diagram showing a relationship between the fly height of a magnetic head and the amplitude of its servo signal.

FIG. 6 illustrates a relationship between the fly height of a magnetic head and the amplitude of a servo signal. It is well known that the level of a signal reproduced by a magnetic head drops if the fly height of the magnetic head becomes abnormally high. In practice, the relationships between the fly heights of magnetic head A, B, and C and the amplitude of their reproduction signal pre-amplified by an arm electronics (AE) were investigated and it was found that they are in a lineal relationship as shown in FIG. 6 although the levels of the reproduction signals vary from head to head. From this, it was found that the fly height of a magnetic head can be detected by measuring the amplitude of a reproduction signal and an abnormal fly height of the magnetic head can be detected by comparing the measured amplitude with a reference value. It should be noted that reproduction signal levels vary from magnetic head to head. The automatic gain controller (AGC) is provided in order to accommodate the variations and amplify the reproduction signals so that output signals are within a predetermined range.

The HDD apparatus of the first embodiment uses a gain set by the AGC 31 instead of directly measuring the amplitude of a reproduction signal reproduced by the magnetic head 12. As described earlier, the AGC 31 automatically adjusts the gain in response to a change in the signal level of the reproduction signal under feedback control based on a digital process. Each time a gain is set by the AGC 31, it is stored in the register, which is not shown, in the channel controller 36. When the preamble of a servo signal is reproduced, an AGC HOLD signal goes low and a gain is adjusted by the AGC 31. Next, the AGC HOLD signal goes high and the gain of the servo signal is determined and maintained. The determined gain is compared with a reference value to detect an abnormal fly height of the magnetic head 12. The reference value for the gain is preset based on actual measurements of a gain of the AGC 31 measured while the fly height of the magnetic head is normal. The reference value is set for each cylinder area 41 (cylinder area Zone0, Zone1, Zone2, . . . ) of each magnetic disk 11 associated with each magnetic head 12.

Thus a reference value best-suited for each head 12 can be set. In addition, an optimum reference value can be set for each cylinder area 41 by taking variations in the fly height of the magnetic head 12 depending on the radial position of the magnetic disk 11 into consideration. The reference value does not need to be set for each cylinder 41. For example, a single reference value may be associated with two or three adjacent cylinder areas 41. By doing so, memory space required for storing reference values can be reduced.

FIG. 7 depicts a table listing actual measurements of the gain of a servo signal for each cylinder area. FIG. 8 illustrates a table listing reference values for the gain of the servo signal for each cylinder area. As shown in FIG. 7, a gain is measured for each of the cylinder areas 41 (Zone0, Zone1, Zone2, . . .) for each of the magnetic heads (Head0, Head1, Head2, and Head3) while the fly height of the magnetic head is normal, and the measurement value table is created. Each value in the measurement value table is multiplied by 1.1 to obtain the reference value table shown in FIG. 8.

When the fly height of the magnetic head is high, the amplitude of the servo signal is small. When the amplitude of the servo signal is small, the gain maintained by the AGC 31 is large. Therefore, the reference value for detecting an abnormal fly height of the magnetic head is larger than the measured value of the gain of the AGC 31 measured when the fly height of the magnetic head is normal. The ratio, 1.1, between a measurement and a reference value was obtained empirically from experiments.

The reference value table shown in FIG. 8 is stored in a system area on the magnetic disk 11. When the HDD apparatus is activated, the reference value table is read from the magnetic disk 11 and stored in the DRAM 24 in the control circuit 20 (shown in FIG. 1). The reference value table may be stored in built-in ROM in the HDC/MPU 23. Alternatively, the measurement table may be stored instead of the reference table, and a required reference value may be calculated.

An abnormal fly height detecting program is stored in the built-in ROM in the HDC/MPU 23 for comparing a gain set by the AGC 31 based on the preamble of a servo signal with a reference value for a cylinder area 41 for a relevant magnetic head 12 to detect an abnormal fly height of the magnetic head 12 when a write operation for writing data on the magnetic disk 11 is initiated by the magnetic head 12. Also stored in the built-in ROM in the HDC/MPU 23 is a retry control program for discontinuing a write operation when an abnormal fly height of the magnetic disk 12 is detected by executing the abnormal fly height detecting program, changing signal processing parameter settings for the AE 17, R/W channel 21 and other components, and retrying the write operation, and a write area change program for changing a write area to an alternate sector to perform the write operation. Alternatively, these programs may be stored in a system area on the magnetic disk 11 and read into the DRAM 24 when the HDD apparatus is activated.

Figure 9:
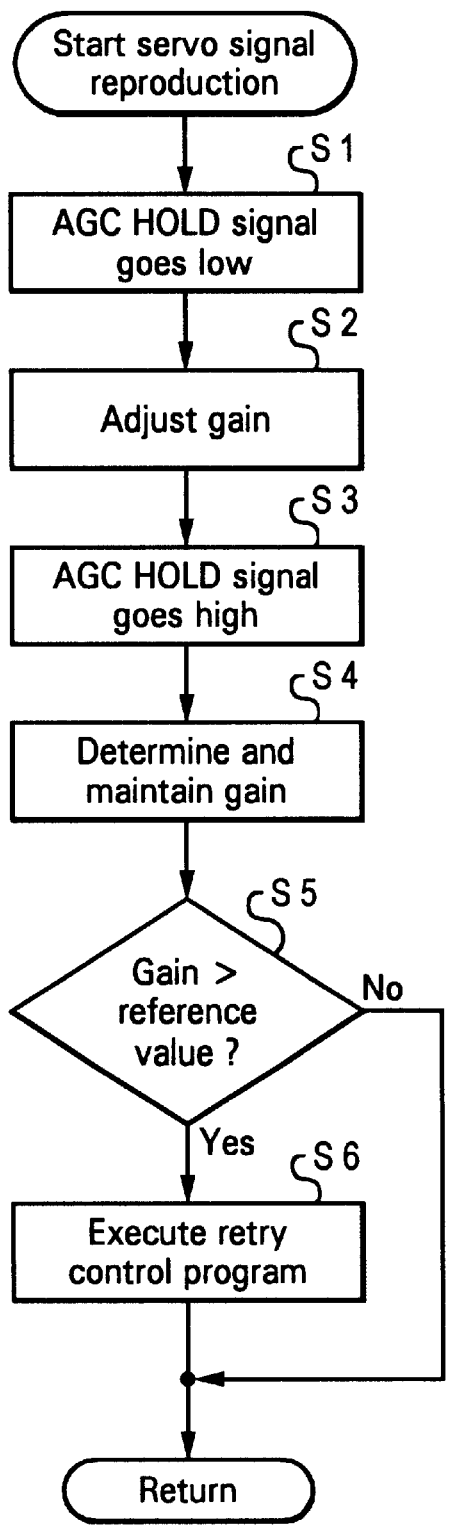
FIG. 9 illustrates a flowchart of a process of an operation for detecting an abnormal fly height of a magnetic head.

FIG. 9 depicts a flowchart of a process for detecting an abnormal fly height of a magnetic head. In an HDD apparatus, a data write operation is initiated and the abnormal fly height detecting program stored in ROM in a HDC/MPU 23 is activated. Next, servo data recorded on a magnetic disk 11 is reproduced by the magnetic head 12. When the head part (preamble) of the servo signal reproduced by the magnetic head 12 is inputted into an AGC 31 through an AE 17, an AGC HOLD signal goes low (step S1) and gain adjustment of the reproduction signal is performed by the AGC 31 (step S2). Next, the AGC HOLD signal goes high at a predetermined timing (step S3) and the gain of the servo signal is determined and maintained by the AGC 31 (step S4).

Next, the gain (held in a register in a channel controller 36) maintained by the AGC 31 is compared with a reference value for a cylinder area 41 for the relevant magnetic head 12 by the HDC/MPU 23. For example, if data is written into cyl2500 of cylinder area 41, zone2 by the magnetic head 12 of Head2, the reference value would be 216 (step S5).

If the gain value is larger than the reference value (if the answer at step S5 is YES), it is determined that the fly height of the magnetic head 12 is abnormal and a retry control program is executed. On the other hand, if the gain is equal to or less than the reference value (if the answer at step S5 is NO), it is determined that the fly height of the magnetic head 12 is normal and the process returns to step S1. The process described above is then repeated for the next servo signal.

Figure 10:
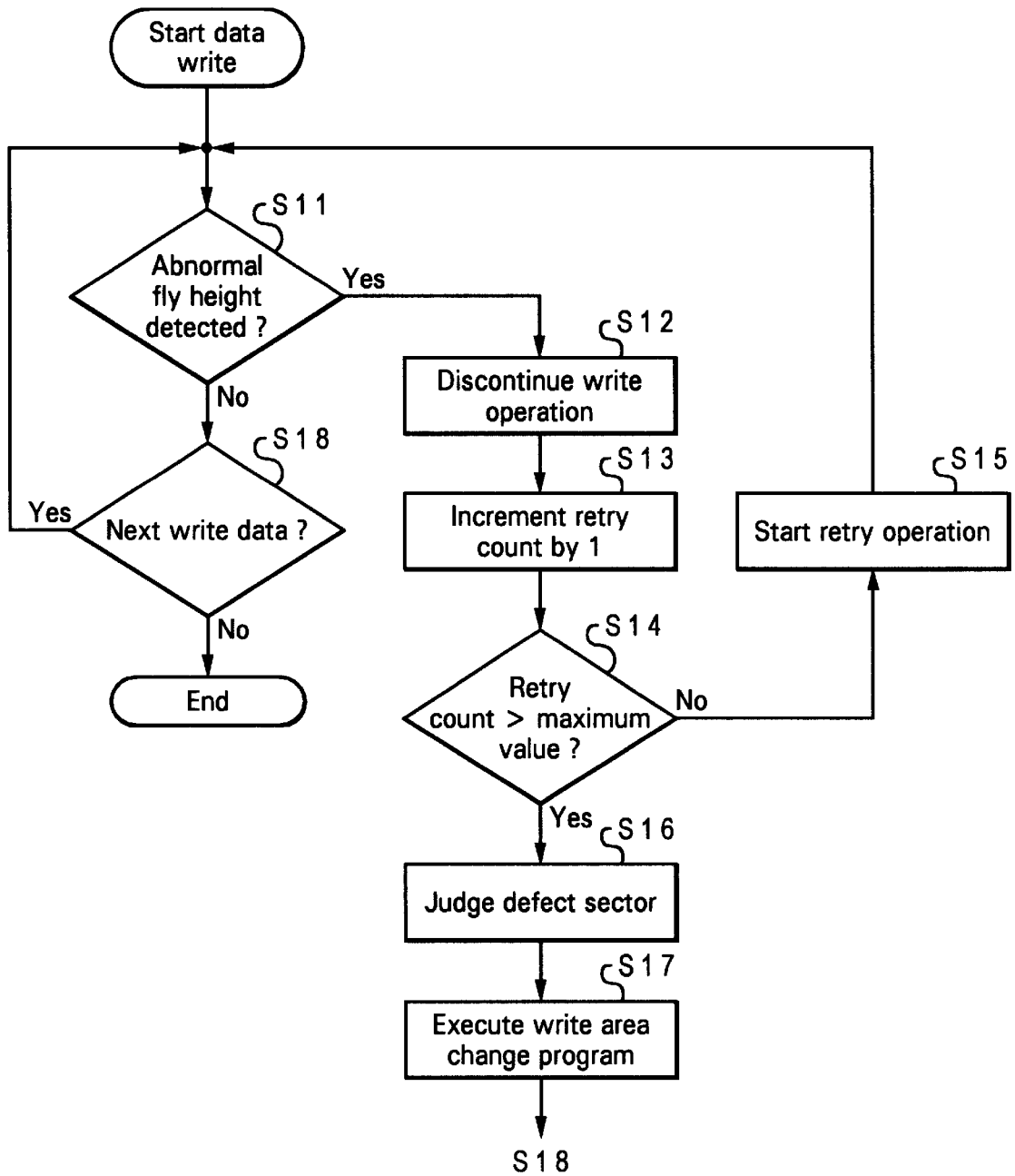
FIG. 10 illustrates a flowchart of a data write operation process.

FIG. 10 illustrates a flowchart of a data write operation process. In an HDD apparatus, a data write operation is initiated and an abnormal fly height detecting program stored in ROM in an HDC/MPU 23 is activated. Next, servo data recorded on a magnetic disk 11 is reproduced by a magnetic head 12.

If an abnormal fly height of the magnetic head 12 is detected (step S11), a retry control program is first executed to discontinue the write operation (step S12). Next, the retry count is incremented by one (step S13), and the retry count is evaluated to determine if it exceeds the maximum value (MAX) (step S14). If the retry count does not exceed the maximum value MAX (if the answer at step S14 is NO), signal processing parameter settings of an AE 17, R/W channel 21 and other components are changed. Next, a retry operation is started to perform the write operation (step S15), followed by returning the process to step S11.

On the other hand, if the retry count exceeds the maximum value MAX (if the answer at step 13 is YES), a sector 61 on the magnetic disk 11 into which the write data is to be recorded is judged as defective (step S16) and a write area change program is executed. An alternate sector substituting for the defective sector is determined and the data is written into the alternate sector (step S17). Next, the process proceeds to step S18 and the data write process ends after the completion of the data write. On the other hand, if an abnormal fly height of the magnetic head 12 is not detected in step S11, the data write process ends after the completion of the data write (step S18).

As described above, according to the first embodiment, the gain of a servo signal is determined based on the head part (preamble) of the servo signal reproduced by the AGC 31 and the subsequent part of the servo signal is amplified when a write operation is initiated. Then the gain of the AGC 31 held in a register in the channel controller 36 is compared with a reference value to detect an abnormal fly height of the magnetic head 12. Thus, unlike prior-art HDD apparatuses, the embodiment requires no measurement circuit for measuring the output waveform of the servo signal. Therefore, a lower-cost HDD apparatus can be constructed.

If an abnormal fly height of a magnetic head 12 is detected, a retry control program can be executed to discontinue a write operation. Therefore, unlike prior-art HDD apparatuses, the present embodiment can prevent damage to data on a magnetic disk which may lead to a result in which correct data cannot be recorded on a magnetic disk even though the write operation is completed. In addition, after a write operation is discontinued, the write operation can be retried, thereby providing higher reliability of data on a magnetic disk.

Furthermore, if a retry operation is repeated a predetermined number of times, a write area change program is executed to allow data to be written in an alternate sector instead of in the originally intended area, thus increasing the reliability of data on the magnetic disk.

Second Embodiment

The configuration of an HDD apparatus according to a second embodiment is the same as that of the HDD apparatus of the first embodiment, except for a method for setting reference values. The HDD apparatus of the second embodiment uses the gain of the previous servo signal determined by the AGC 31, instead of storing the reference value table provided in FIG. 8.

Figure 11:
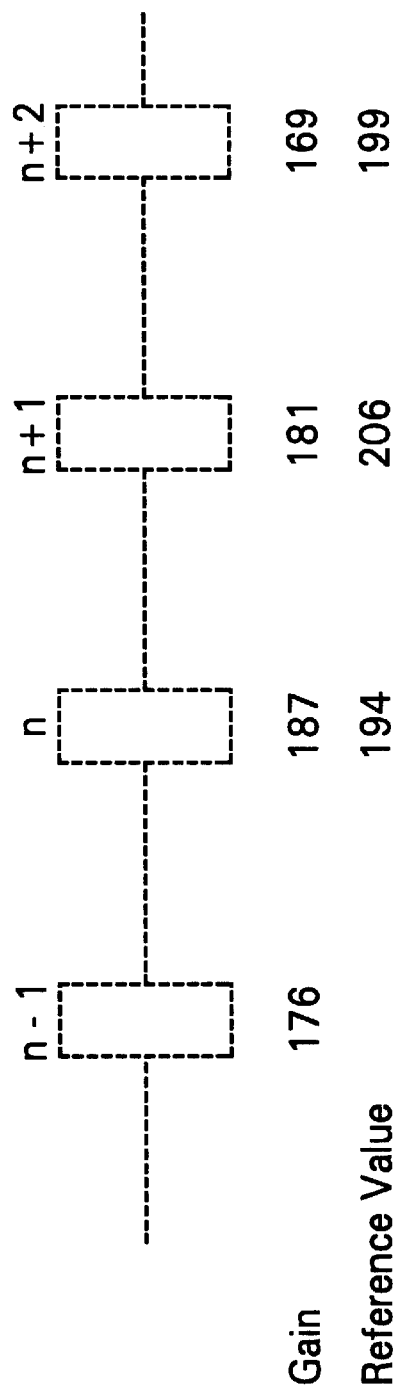
FIG. 11 illustrates an diagram for explaining a method for setting a reference value for a HDD apparatus according to a second embodiment.

FIG. 11 depicts a diagram for explaining a method for setting a reference value for an HDD apparatus of a second embodiment. It is assumed that, based on the n−1th, nth, n+1th, and n+2th reproduced servo signal as shown in FIG. 11, the following gains of an AGC 31 are obtained:

$$G(n-1) = 176,$$
$$G(n) = 187,$$
$$G(n+1) = 181, \text{ and}$$
$$G(n+2) = 169.$$

Reference values for these gains can be calculated by multiplying the gains of the previous servo signals by an appropriate factor, for example 1.1. The factor, 1.1, was empirically obtained from experiments. For example, the reference value for the nth gain is 194, which equals the gain of the n−1th servo signal, G(n−1)=176, multiplied by 1.1. The reference value for the n+1th gain is 206, which equals the gain of the nth servo signal, 187, multiplied by 1.1.

Preferably, the reference values are maintained separately for each magnetic head 12 and the gain of the previous servo signal for a magnetic head 12 is used for the same magnetic head 12. Thereby the effects of variations in reproduction property of the magnetic heads 12 can be eliminated. The reference values may be maintained for each of the cylinder areas 41 (Zone0, Zone1, Zone2, . . . ) on each disk 11 of the magnetic disk 12 and the gain of a servo signal for the same cylinder area 41 may be used. It is not necessarily required that a reference value is provided for each cylinder area 41. For example, one reference value may be associated with a plurality of cylinder areas 41 close to one another. This allows memory space required for storing the reference values to be reduced.

As described above, according to the second embodiment, the gain of the previous servo signal determined by the AGC 31 is used to update a reference value. This can eliminate the need for creating the reference value table shown in FIG. 8 for every product (HDD apparatuses).

While a gain set by the AGC 31 is compared with a reference value in the first and second embodiments, an HDD apparatus may be configured in a way that an amplitude detection circuit is provided for measuring the amplitude (peak value) of a reproduction signal output from an AE 17 and the amplitude measured by the circuit is compared with the reference value. This configuration eliminates the need for a circuit to measure the area of a servo signal, which is provided in a prior-art HDD apparatus, thereby allowing an HDD apparatus to be constructed at a relatively lower cost.

Figure 12:
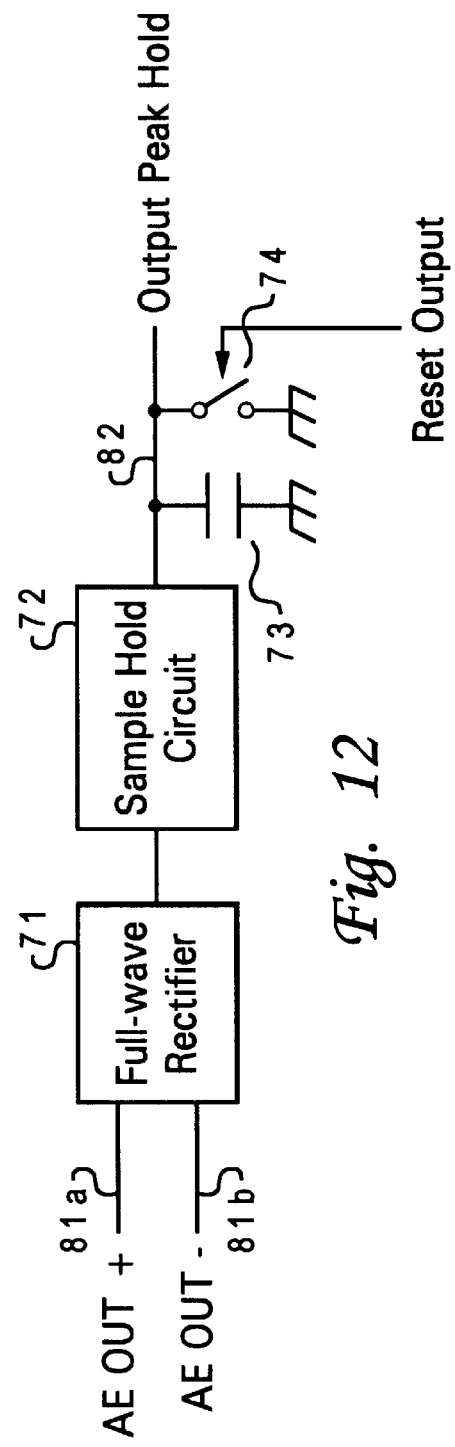
FIG. 12 illustrates a block diagram of major components of an amplitude detection circuit for measuring the amplitude of a servo signal.
Figure 13A:
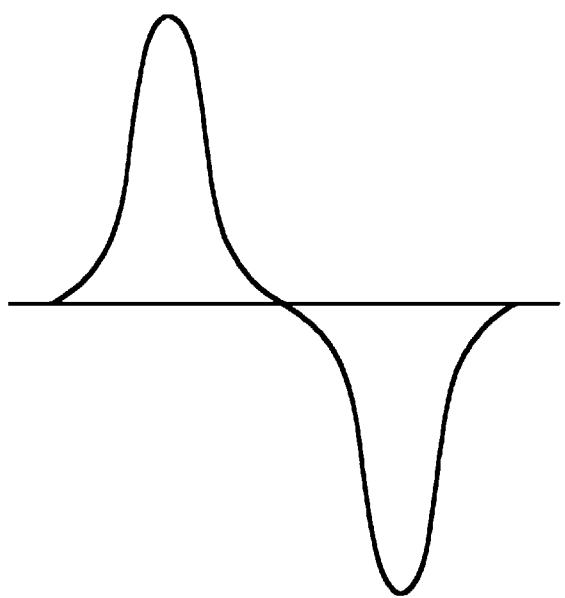
FIG. 13A illustrates the output waveform of a servo signal when the fly height of a magnetic head is normal.
Figure 13B:
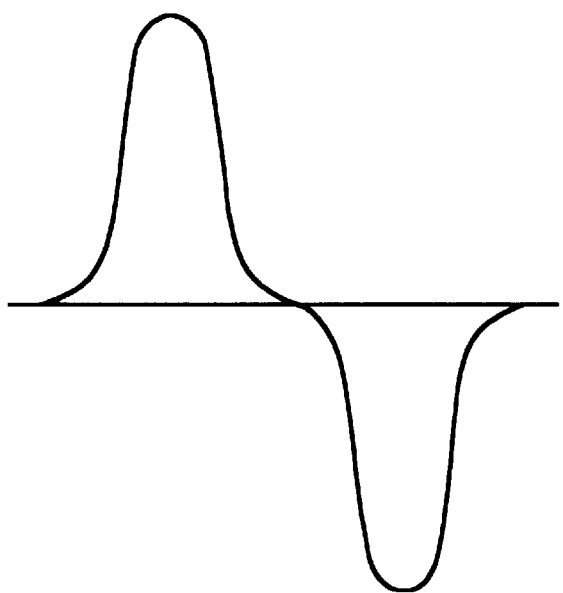
FIG. 13B illustrates the output waveform of the servo signal when the fly height of the magnetic head is abnormally high.

FIG. 12 illustrates a block diagram of major components of an amplitude detection circuit for measuring the amplitude of a servo signal. As shown in FIG. 12, the amplitude detection circuit includes a full-wave rectifier 71, a sample hold circuit 72, a capacitor 73, and a reset switch 74. The two input terminals of the full-wave rectifier 71 are coupled to the positive and negative output terminals of the AE 17 through input lines 81a and 81b, respectively. The output terminal of the sample hold circuit 72 is coupled to an analogue-digital converter, which is not shown, through an output line 82. Connected to the output line 82 are the capacitor 73, one end of which is grounded and the reset switch 74.

The full-wave rectifier 71 converts a reproduction signal (ac signal) output by the AE 17 into a dc signal. The sample hold circuit 72 samples the converted dc signal to obtain the amplitude of the reproduction signal. When the reset switch 74 is on-off controlled, the maximum voltage of the reproduction signal during a certain period is stored in the capacitor 73 by the sample hold circuit 72 and thus the peak value of the reproduction signal can be obtained. The peak value is converted into a digital value by the analogue-digital converter, which is not shown, and it is compared with a reference value.

Because the amplitude of a servo signal becomes small when the fly height of the magnetic head becomes high, a reference value for the peak value (amplitude) of the reproduction signal is smaller than the amplitude measured by the AE 17 during the flying height of the magnetic head is normal. It is desirable that the ratio of a reference value to a measured value is about 0.9.

According to the present invention, the gain of a servo signal reproduced by a magnetic head is determined based on the head part of the servo signal and the subsequent part of the servo signal which succeeds the head part is amplified according to the determined gain. The gain or amplitude of the amplified servo signal is compared with a reference value to detect an abnormal fly height of the magnetic head.

If the gain of a servo signal is compared with the reference value, a register in the amplifier of the R/W channel for storing the gain can be accessed to compare the gain with the reference value. Therefore, the HDD apparatus can be constructed at low cost because any new circuitry is not required. If the amplitude of a servo signal is compared with a reference value, only an additional circuit for measuring servo signal amplitude is required, thus eliminating the need for providing a circuit for measuring the area of a servo signal.

Furthermore, according to the present invention, a write operation can be discontinued if an abnormal fly height of a magnetic head is detected. Therefore, unlike prior-art HDD apparatuses, the present invention can prevent damage to data on a magnetic disk which may lead to a result in which correct data cannot be recorded on a magnetic disk even though the write operation is completed. In addition, after a write operation is discontinued, the write operation can be retried, providing higher reliability of data on a magnetic disk. Furthermore, if a retry operation is repeated a predetermined number of times, data can be written in an alternate sector instead of an area originally intended, therefore increasing the reliability of data on a magnetic disk.

While the invention has been particularly shown and described with reference to a preferred embodiment, it will be understood by those skilled in the art that various changes in form and detail may be made therein without departing from the spirit and scope of the invention.

What is claimed is:

1. A method for reading data from a magnetic disk, comprising:

reading a preamble from a servo signal recorded on a magnetic disk utilizing a magnetic head, the servo signal including the preamble, a Gray code, and a burst pattern;

determining a gain, which is determined by a gain control, of the preamble, the gain of the preamble being a pre-amplification gain required to amplify the preamble's signal to a level required by a read/write channel;

storing the gain of the preamble in a register; and comparing said gain of the preamble with a reference value to detect an abnormal fly height of the magnetic head;

if comparing the gain of the preamble indicates that the fly height is normal, then applying the preamble gain to the signals read by the magnetic head when reading the Gray code and the burst pattern; and if comparing the gain of the preamble indicates that the fly height is abnormal, then retrying the reading of the preamble a pre-determined number of times before abandoning the reading of the preamble.

2. The method a recited in claim 1, wherein the magnetic head is from a plurality of magnetic heads, each magnetic head has a specific reference value indicating a normal fly height for that magnetic head.

3. The method as recited in claim 1, wherein the preamble is a current preamble of a currently read servo signal, the reference value for the currently read servo signal being based on a measured gain of a previous servo signal's preamble, and a subsequent reference value, for a subsequent servo signal, being based on the gain of the currently read servo signal's preamble.

4. The method as recited in claim 3, wherein the reference value for the currently read servo signal is determined by multiplying the gain of said previous servo signal's preamble with a number greater than one.

5. The method as recited in claim 4, wherein the number is 1.1.

6. The method as recited in claim 1, wherein a separate reference value is set for each of the predetermined cylinder areas on a recording surface of the magnetic disk.

7. A method for detecting an abnormal fly height of a magnetic head, the method comprising;

reading a servo signal recorded on a magnetic disk utilizing a magnetic head;

determining an amplitude of the servo signal;

storing the amplitude of the servo signal in a capacitor, the capacitor having a re-set switch to discharge the capacitor before the storing of the servo signal's amplitude in the capacitor; and comparing the amplitude of the servo signal with a reference value to detect an abnormal fly height of the magnetic head.

8. The method as recited in claim 7, wherein the reference value is an amplitude of a servo signal determined when a fly height of the magnetic head is normal.

9. The method as recited in claim 7, wherein the servo signal is a current servo signal, and wherein the reference value of the current servo signal is based on an amplitude of a previous servo signal, and a subsequent servo sianal's reference value is based on the amplitude of the current servo signal.

10. The method as recited in claim 2, wherein separate reference value is set for each of the predetermined cylinder areas on a recording surface of said magnetic disk.

11. A method for writing data on a magnetic disk, the method comprising:

reading a preamble from a servo signal recorded on the magnetic disk utilizing a magnetic head in response to an initiation of a write operation;

determining a gain of the preamble of the servo signal;

comparing the gain of the preamble with a reference value to detect an abnormal fly height of the magnetic head;

if the gain of the preamble indicates a normal fly height of the magnetic head, then writing a user data to the magnetic disk using the gain of the preamble; and if the gain of the preamble indicates an abnormal fly height of the magnetic head, then discontinuing the write operation after a pro-determined number of write re-tries.

12. The method as recited in claim 11, wherein the magnetic head is from a plurality of magnetic heads, each magnetic head having a specific reference value indicating a normal fly height for that magnetic head.

13. The method as recited in claim 12, further including:

changing a recording area into which data is to be written to an alternate area after retrying a write operation the pre-determined number of write re-tries; and performing the write operation on the alternate area.

14. A hard disk drive apparatus comprising:

at least one rotating magnetic disk;

at least one magnetic head that records data on said magnetic disk and reproduces data recorded on the magnetic disk;

servo signal reproduction control means for causing the magnetic head to reproduce a servo signal recorded on the magnetic disk when a write operation for writing data on the magnetic disk is initiated;

an amplitude detection circuit that determines an amplitude of the servo signal, the amplitude detection circuit including:

a full-wave rectifier that converts the servo signal into a DC signal;

a sample hold circuit, coupled to the full-wave rectifier, that samples the converted DC signal to obtain the amplitude of the servo signal;

a capacitor coupled to the sample hold circuit; and a reset switch that operates to store a maximum voltage of the servo signal during a certain period of time in the capacitor; and abnormal fly height detection means for comparing the amplitude of the servo signal with a reference value to detect an abnormal fly height of the magnetic head.

15. The hard disk drive apparatus as recited in claim 14, further comprising a write operation discontinuing means for discontinuing the write operation in response to detecting an abnormal fly height of the magnetic head.

16. A computer program product, comprising:

a computer-readable medium having stored thereon computer executable instructions for implementing a method for reading data from a magnetic disk, said computer executable instructions when executed, perform the steps of:

reading a preamble from a servo signal recorded on a magnetic disk utilizing a magnetic head, the servo signal including the preamble, a Gray code, and a burst pattern;

determining a gain, which is determined by a gain control, of the preamble, the gain of the preamble being a pre-amplification gain required to amplify the preamble's signal to a level required by a read/write channel;

storing the gain of the preamble in a register;

comparing said gain of the preamble with a reference value to detect an abnormal fly height of the magnetic head;

if comparing the gain of the preamble indicates that the fly height is abnormal, then applying the gain to the signals read by the magnetic head when reading the Gray code and the burst pattern; and if comparing the gain of the preamble indicates that the fly height is abnormal, then retrying the reading of the preamble a pre-determined number of times before abandoning the reading of the preamble.

17. The computer program product as recited in claim 16, wherein the magnetic head is from a plurality of magnetic heads, each magnetic head having a specific reference value indicating a normal fly height for that magnetic head.

18. The computer product a recited in claim 16, wherein the preamble is a current preamble of a currently read servo signal, the reference value for the currently read servo signal being based on a measured gain of a previous servo signal's preamble, and a subsequent reference value, for a subsequent servo signal, being based on the gain of the currently read servo sianal's preamble.

19. A computer program product comprising:
  a computer-readable medium having stored thereon computer executable instructions for writing data from a magnetic disk, said computer executable instructions when executed, perform the steps of:
  reading a preamble from a servo signal recorded on a magnetic disk utilizing a magnetic head in response to an initiation of a write operation;
  determining a gain of the preamble of the servo signal;
  comparing the gain of the preamble with a reference value to detect an abnormal fly height of the magnetic head;
  if the gain of the preamble indicates a normal fly height of the magnetic head, then writing a user data to the magnetic disk using the gain of the preamble; and
  if the gain of the preamble indicates an abnormal fly height of the magnetic head then discontinuing the write operation after a pre-determined number of write re-tries.

20. The computer program product as recited in claim 19, wherein the magnetic head is from a plurality of magnetic heads, each magnetic head having a specific reference value indicating a normal fly height for that magnetic head.

21. The computer program product as recited in claim 19, further comprising computer executable instructions for:
  changing a recording area into which data is to be written to an alternate area after retrying a write operation the pre-determined number of write re-tries; and
  performing the write operation on the alternate area.

* * * * *

UNITED STATES PATENT AND TRADEMARK OFFICE
CERTIFICATE OF CORRECTION

PATENT NO. : 6,671,110 B2  
APPLICATION NO. : 09/776360  
DATED : December 30, 2003  
INVENTOR(S) : Baba et al.

Page 1 of 1

It is certified that error appears in the above-identified patent and that said Letters Patent is hereby corrected as shown below:

In Col. 10, line 62 (Claim 1), please delete "*and*", as amended.

In Col. 11, line 9 (Claim 2), please replace "*has*" with --having--.

In Col. 11, line 20 (Claim 4), please replace "*said*" with --the--.

In Col. 11, line 46 (Claim 9), please replace "*sianal's*" with --signal's--.

In Col. 11, line 49 (Claim 10), please replace "*claim 2,*" with --claim 9,--; insert --a-- between the words "*wherein*" and "*separate*".

In Col. 11, line 66 (Claim 11), please replace "*pro-determined*" with --pre-determined--.

In Col. 12, line 39 (Claim 16), please delete "," after "*product*".

In Col. 12, line 59 (Claim 16), please replace "*abnormal*" with --normal--.

In Col. 13, line 3 (Claim 18), please replace "*a*" with --as--.

Signed and Sealed this

Third Day of March, 2009

JOHN DOLL  
*Acting Director of the United States Patent and Trademark Office*